(12) United States Patent
Suzuki et al.

(10) Patent No.: US 6,262,758 B1
(45) Date of Patent: Jul. 17, 2001

(54) IMAGE FORMATION APPARATUS WITH CLOCK CIRCUIT FOR DRIVING RECORDING CHIPS (75) Inventors: Kazuyoshi Suzuki; Toshihiko Ohtsubo, both of Numazu; Michio Kawase, Mishima; Takahiro Watanabe, Shizuoka-ken; Jun Yamaguchi, Yokohama; Tetsuro Fukusaka, Susono, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,955

(22) Filed: Jan. 14, 2000

(30) Foreign Application Priority Data

Jan. 18, 1999 (JP) .................................. 11-009544

(51) Int. Cl.$^7$ ...................................... B41J 2/47
(52) U.S. Cl. ......................... 347/237; 347/235; 347/247
(58) Field of Search ................... 347/130, 235, 347/237, 238, 247; 257/676; 375/372, 375; 348/521, 524

(56) References Cited

U.S. PATENT DOCUMENTS

| 5,285,247 | * | 2/1994 | Itoh ........................................ 347/237 |
| 5,550,877 | * | 8/1996 | Waters .................................... 375/372 |
| 5,832,190 | | 11/1998 | Terajima et al. ..................... 358/1.14 |
| 5,847,729 | | 12/1998 | Takahashi et al. .................... 347/43 |
| 6,008,833 | | 12/1999 | Ohtsubo et al. ..................... 347/237 |
| 6,024,431 | | 2/2000 | Takahashi et al. ..................... 347/19 |
| 6,027,200 | | 2/2000 | Takahashi et al. ..................... 347/19 |
| 6,031,974 | | 2/2000 | Takahashi et al. ..................... 358/1.9 |
| 6,069,644 | * | 5/2000 | Tanioka et al. ..................... 347/238 |

FOREIGN PATENT DOCUMENTS

| 1-238962 | 9/1989 | (JP) . |
| 2-208067 | 8/1990 | (JP) . |
| 2-212170 | 8/1990 | (JP) . |
| 4-23367 | 1/1992 | (JP) . |
| 4-5872 | 1/1992 | (JP) . |
| 4-296579 | 10/1992 | (JP) . |
| 5-84971 | 4/1993 | (JP) . |

* cited by examiner

Primary Examiner—N. Le
Assistant Examiner—Hai C. Pham
(74) Attorney, Agent, or Firm—Fitzpatrick, Cella, Harper & Scinto (57) ABSTRACT An image formation apparatus which records an image on a recording medium is provided. The apparatus has a recording element array head on which plural recording chips are arranged, plural recording elements being arrayed on the recording chip, a reference clock generation unit for generating a reference clock, a main scan sync signal generation unit for generating a main scan sync signal by dividing the reference clock into $2^{n1}$ (n1: positive number) parts, an input unit for raster inputting image data for one line in synchronism with the main scan sync signal, a drive clock generation unit for generating a drive clock by dividing the reference clock into $2^{n2}$ (n2: positive number) parts and a drive unit for driving the recording chips in synchronism with the drive clock.

7 Claims, 8 Drawing Sheets

IMAGE FORMATION APPARATUS WITH CLOCK CIRCUIT FOR DRIVING RECORDING CHIPS

BACKGROUND OF THE INVENTION

1. Field of the Invention

The present invention relates to an image formation apparatus.

2. Related Background Art

Figure 1A:
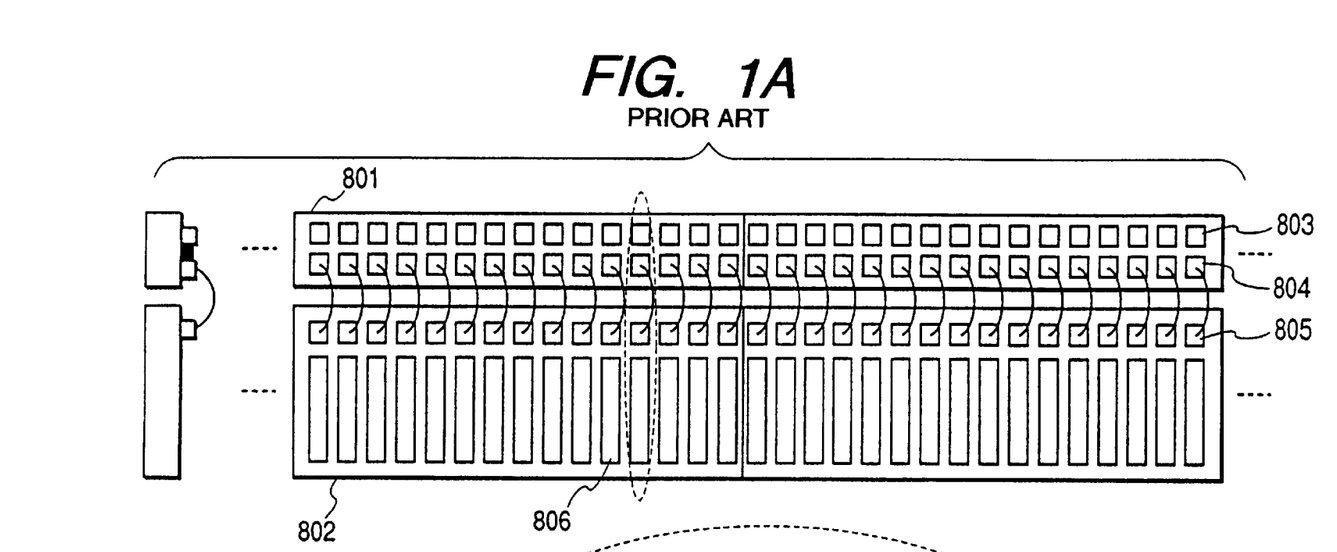
FIGS. 1A and 1B are a structural view for explaining a conventional LED array.
Figure 1B:
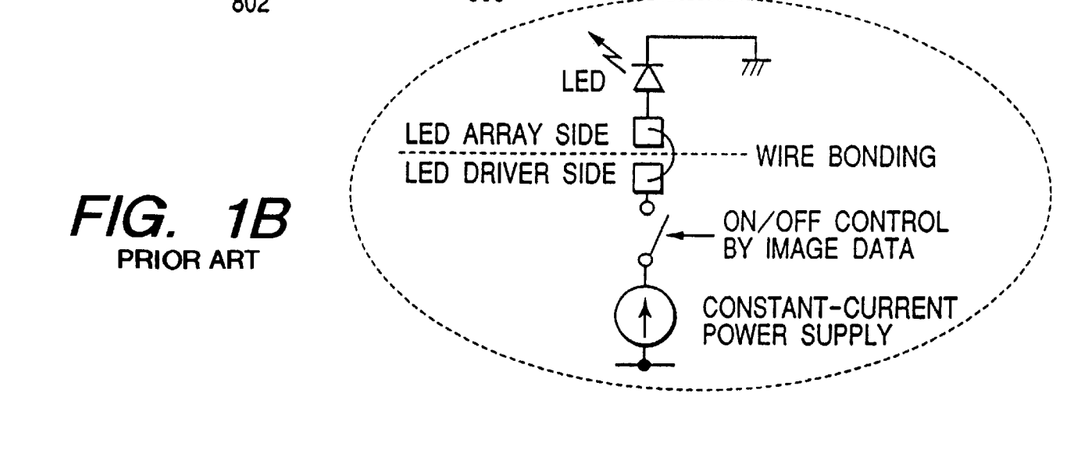

The conventional LED head has the structure shown in FIGS. 1A and 1B. In this structure, plural chips, on which LED light emission elements are arranged in an array state in one column, are arranged in a column state and the chip can form an image for one line. Here, an LED array to be used has the structure where an anode or a cathode of the LED chip is composed of a common electrode and one side generally forms a pad which can be connected to a driver. In this conventional example, the description will be given for a case where the cathode is the common electrode.

Numeral 801 denotes one of the LED chips, on which plural LED light emission elements 803 are arranged. Numeral 804 denotes connection pads, which correspond to the LED's 803, connected to driver units, which correspond to LED light emission elements of an LED chip driver 802, by wire bonding. Of course, also at the LED chip driver 802 side, connection pads 805 at the driver side, which correspond to the connection pads at the LED chip side, are provided. In the case of this LED chip, one light emission control unit is necessary for one LED light emission unit. At the LED driver side, drive control units 806 equal to the number of the LED light emission units, which can be ON/OFF controlled by an image signal, are provided.

In the above-mentioned LED array, since the light emission units have to be one-to-one connected to the driver units by the wire bonding, there occurs a complication problem to realize high integration because the wire bonding becomes a hindrance as neck portions.

As a method for realizing the high integration of the LED array, there has been known a method of using a SLED (Self-Scanning Light Emitting Diode), in which a shifting function is given to the LED array chip. For example, the SLED is disclosed in Japanese Patent Application Laid-Open Nos. 1-238962, 2-208067, 2-212170, 4-5872, 4-23367, 4-296579, and 5-84971. Also, Proceedings of the 1990 IEICE (The Institute of Electronics, Information and Communication Engineers) Spring Conference (Mar. 5, 1990) "Self-Scanning Type Light Emission Element (SLED) Using PNPN Thyristor Structure", and Japan Hard Copy 1991 "Light Emission Element Array for Optical Printer in Which Driving Circuits are Integrated" have been disclosed.

As described later, since the use of the SLED chip can extremely reduce the number of connections (wire bonding) between the light emission units and the driver units, it becomes easy to provide high integration without it being prevented because of the wire bonding neck.

As explained above, in the SLED, since light emission of the elements is successively performed in each of the chips, assuming that the number of light emission elements in one chip is defined as m, a maximum time given to perform the light emission for each light emission element becomes 1/m of the maximum time during a period of one main scanning.

However, in this manner, if a light emitting time of each light emission element is set at the maximum time, the structure of a circuit which generates a timing signal becomes more complex.

SUMMARY OF THE INVENTION

An object of the present invention is to solve the above-mentioned problem.

In order to achieve the above object, the present invention provides an image formation apparatus which records an image on a recording medium, comprising:

a recording element array head on which plural recording chips are arranged, plural recording elements being arrayed on each of the recording chips;

a reference clock generation means for generating a reference clock;

a main scan sync signal generation means for generating a main scan sync signal by dividing the reference clock into $2^{n1}$ (n1: positive number) parts;

an input means for raster inputting image data for one line in synchronism with the main scan sync signal;

a drive clock generation means for generating a drive clock by dividing the reference clock into $2^{n2}$ (n2: positive number) parts; and a drive means for driving the recording chips in synchronism with the drive clock.

Another object, structure and effect of the present invention will become apparent from the following detailed description and the attached drawings.

DETAILED DESCRIPTION OF THE PREFERRED EMBODIMENT

The embodiment of the present invention will be described in detail with reference to the attached drawings.

Figure 5:
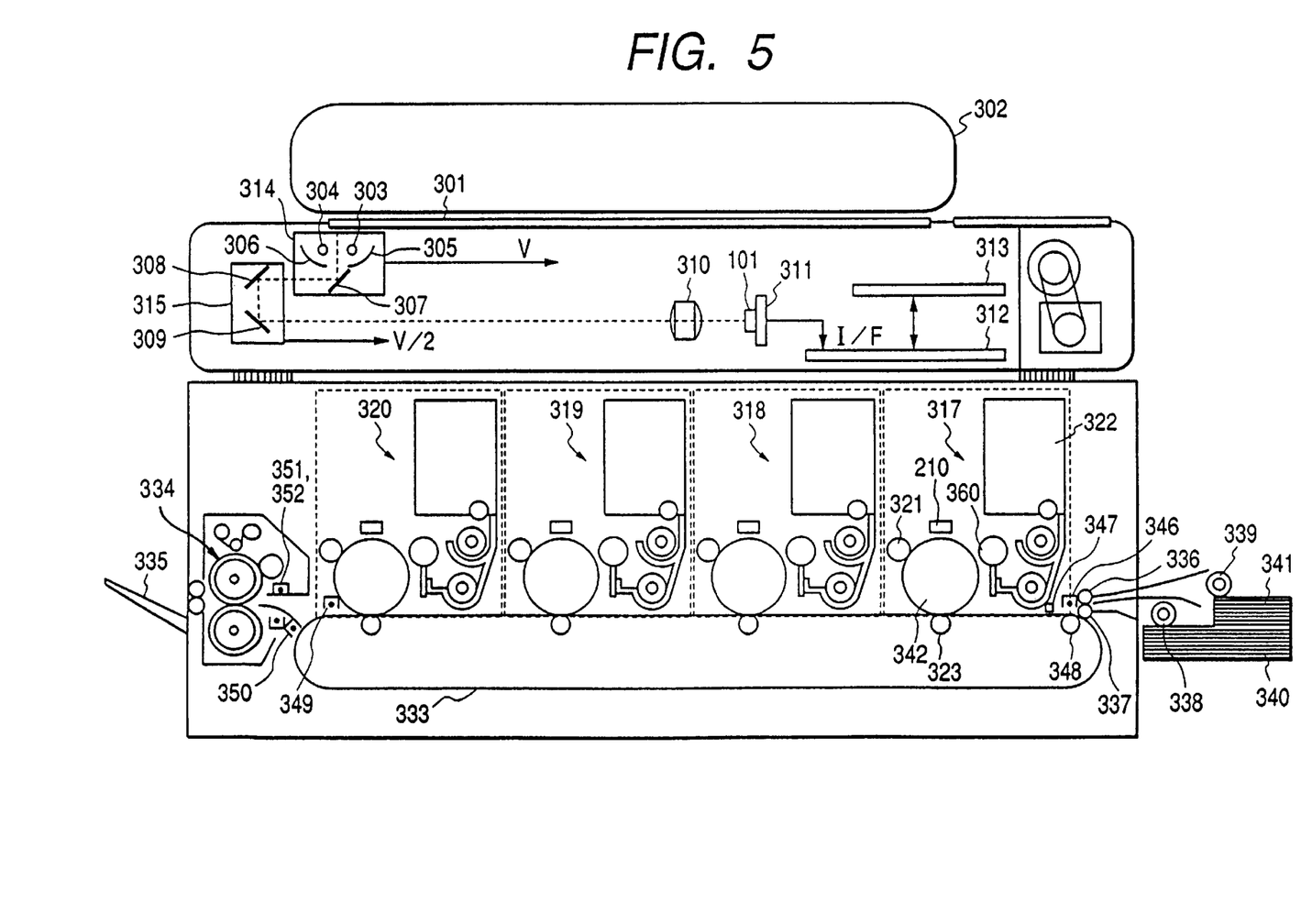
FIG. 5 is a cross-sectional view of a color image formation apparatus used for explaining an embodiment of the present invention.

FIG. 5 shows an overall outline structure of a color image formation apparatus.

First, the structure of a color reader unit will be described. In FIG. 5, numeral 101 denotes a CCD, numeral 311 denotes a substrate mounting the CCD 101 and numeral 312 denotes a printer processing unit. Numeral 301 denotes an original mounting glass (platen), numeral 302 denotes an original feed unit (structure mounting a mirror pressure plate or a white pressure plate (not shown) may be available instead of the original feed unit 302) and numerals 303 and 304 denote light sources such as halogen lamps or fluorescent lamps for illuminating an original. Numerals 305 and 306 denote reflection parasols for condensing the light from the light sources 303 and 304 on the original. Numerals 307, 308 and 309 denote mirrors.

Numeral 310 denotes a lens for condensing reflected light or projected light from the original on the CCD 101. Numeral 314 denotes a carriage which holds the halogen lamps 303 and 304, the reflection parasols 305 and 306 and the mirror 307. Numeral 315 denotes a carriage which holds the mirrors 308 and 309. Numeral 313 denotes an interface (I/F) unit for interfacing with another IPU (image processing unit) or the like. The carriages 314 and 315 mechanically move at speed V and V/2 respectively in the vertical (sub scanning) direction for an electrical scanning (main scanning) direction of the CCD 101 so as to scan an entire surface of the original.

Next, the structure of a printer unit shown in FIG. 5 will be described. Numeral 317 denotes a yellow (Y) image formation unit, numeral 318 denotes a magenta (M) image formation unit, numeral 319 denotes a cyan (C) image formation unit and numeral 320 denotes a black (K) image formation unit. Since each image formation unit has the identical structure, only the Y image formation unit 317 will be described in detail and the description of other image formation units will be omitted.

In the Y image formation unit 317, numeral 342 denotes a photosensitive drum on which a latent image is formed by the light from an LED array 210. Numeral 321 denotes a primary charger which charges a surface of the photosensitive drum 342 to reach a predetermined potential for preparing to form the latent image. Numeral 322 denotes a development unit which develops the latent image on the photosensitive drum 342 for forming a toner image. The development unit 322 includes a sleeve 360 used for developing by applying a developing bias.

Numeral 323 denotes a transfer charger which performs a discharging from a back side of a transfer material conveying belt 333 so as to transfer the toner image on the photosensitive drum 342 to a recording sheet or the like on the transfer material conveying belt 333. In this embodiment, since a transfer efficiency is excellent, a cleaner unit is not provided. However, it is needless to say that there occurs no problem if the cleaner unit is provided.

Next, a procedure of transferring the toner image on a transfer material such as the recording sheet or the like will be described. The transfer materials such as the recording sheets or the like stored in cassettes 340 and 341 are fed one by one on the transfer material conveying belt 333 through sheet feed rollers 336 and 337 by pick-up rollers 339 and 338. The fed recording sheets are charged by an adsorption charger 346.

Numeral 348 denotes a transfer material conveying belt roller which drives the transfer material conveying belt 333 and charges the recording sheets or the like paired with the adsorption charger 346 so as to adsorb the recording sheet or the like to the transfer material conveying belt 333. It should be noted that the transfer material conveying belt roller 348 may be treated as a drive roller for driving the transfer material conveying belt 333 or another drive roller used for driving the transfer material conveying belt 333 may be disposed on an opposite side.

Numeral 347 denotes a sheet leading edge sensor which detects a leading edge of the recording sheet or the like on the transfer material conveying belt 333. A detection signal of the sheet leading edge sensor 347 is transmitted from the printer unit to the color reader unit to be used as a sub scan sync signal when a video signal is transmitted from the color reader unit to the printer unit.

Thereafter, the recording sheet or the like is conveyed by the transfer material conveying belt 333 to form the toner image on a surface of that sheet in the order of Y, M, C and K in the image formation units 317, 318, 319 and 320. The transfer material such as the recording sheet or the like passed through the K image formation unit 320 is discharged by a charge elimination charger 349 such that the transfer material can be easily separated from the transfer material conveying belt 333. Thereafter, the transfer material is separated from the transfer material conveying belt 333. Numeral 350 denotes a separation charger which prevents an image blur on the recording sheet or the like due to a separation electric discharge when the recording sheet or the like is separated from the transfer material conveying belt 333. The separated recording sheet or the like is charged by prefixing chargers 351 and 352 to prevent the image blur by supplementing adsorptive ability of the toner, and then the toner image is thermally fixed by a fixing unit 334. Thereafter, the recording sheet or the like is discharged to a discharging tray 335.

The structure of LED arrays 210, 211, 212 and 213 will be described with reference to FIG. 6.

Figure 6:
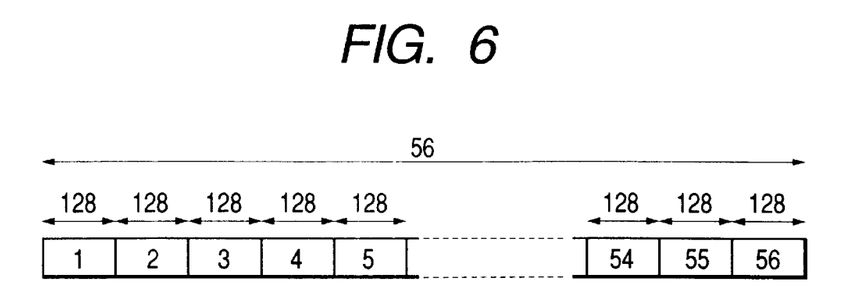
FIG. 6 is a view for explaining a structure of an LED head in the embodiment of the present invention.

As shown in FIG. 6, one chip of the LED array is composed of units of 128 light emission elements and one LED array head is structured by 56 chips of the LED arrays which are sequentially combined. That is, the one head is structured by 128×56=7168 light emission elements.

Figure 2:
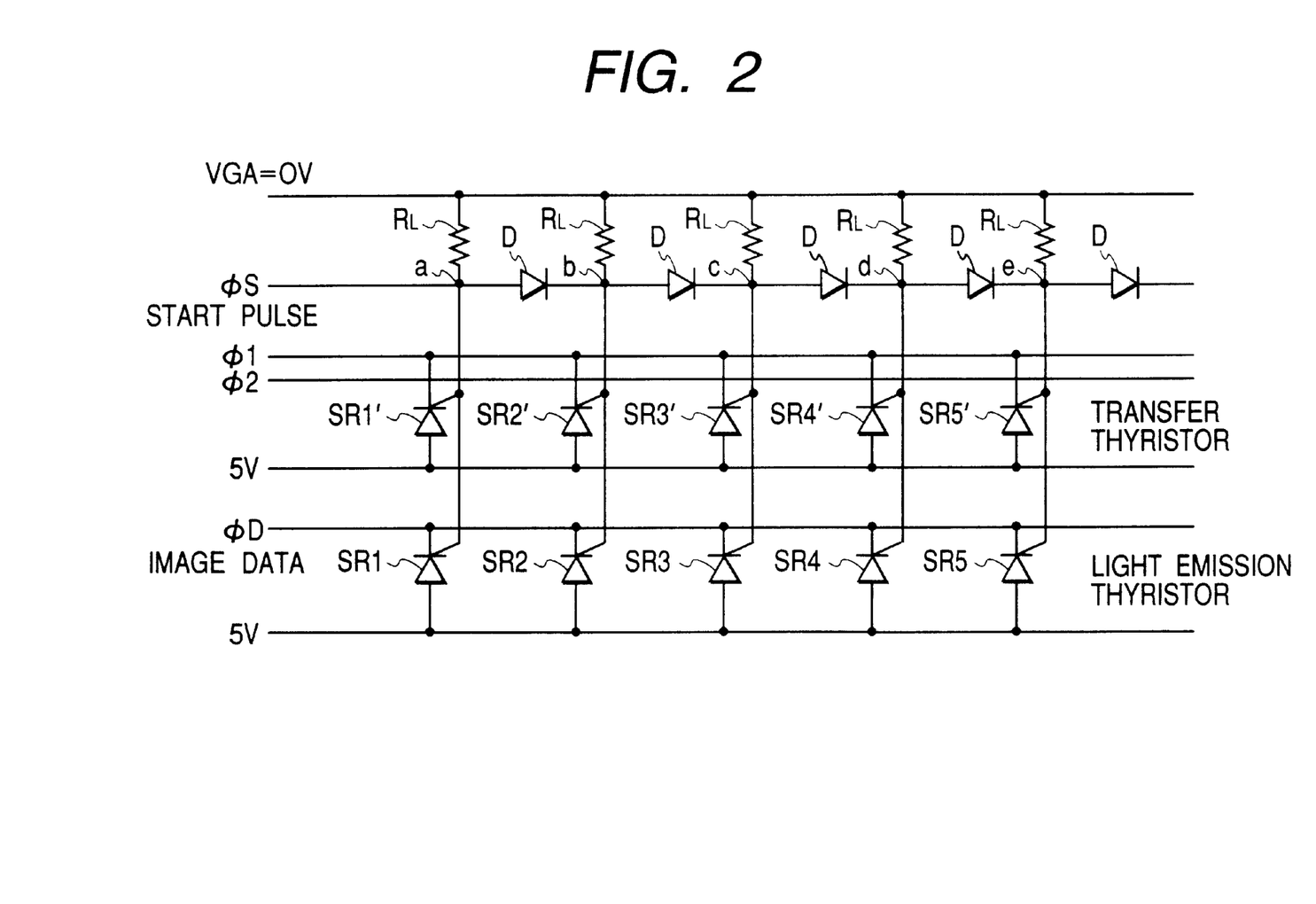
FIG. 2 is a view showing an equivalent circuit of a SLED.

FIG. 2 is a circuit diagram showing an equivalent circuit of this type of a light emission element array having a self-scanning function. As shown in FIG. 2, a SLED is composed of a circuit on which transfer thyristors are arranged in an array state and a circuit on which light emission thyristors are arranged in array state. Each of corresponding gates of the transfer thyristors is connected to each of the gate signals of the light emission thyristors. A first thyristor is connected to a signal input unit for a use of inputting a start pulse $\phi$S. A gate of a second thyristor is connected to a cathode of a diode which is connected to a gate of a thyristor connected to a terminal for a use of terminating the start pulse $\phi$S. A gate of a third thyristor is connected to a cathode of a next diode. Thus, the SLED is structured.

Figure 4:
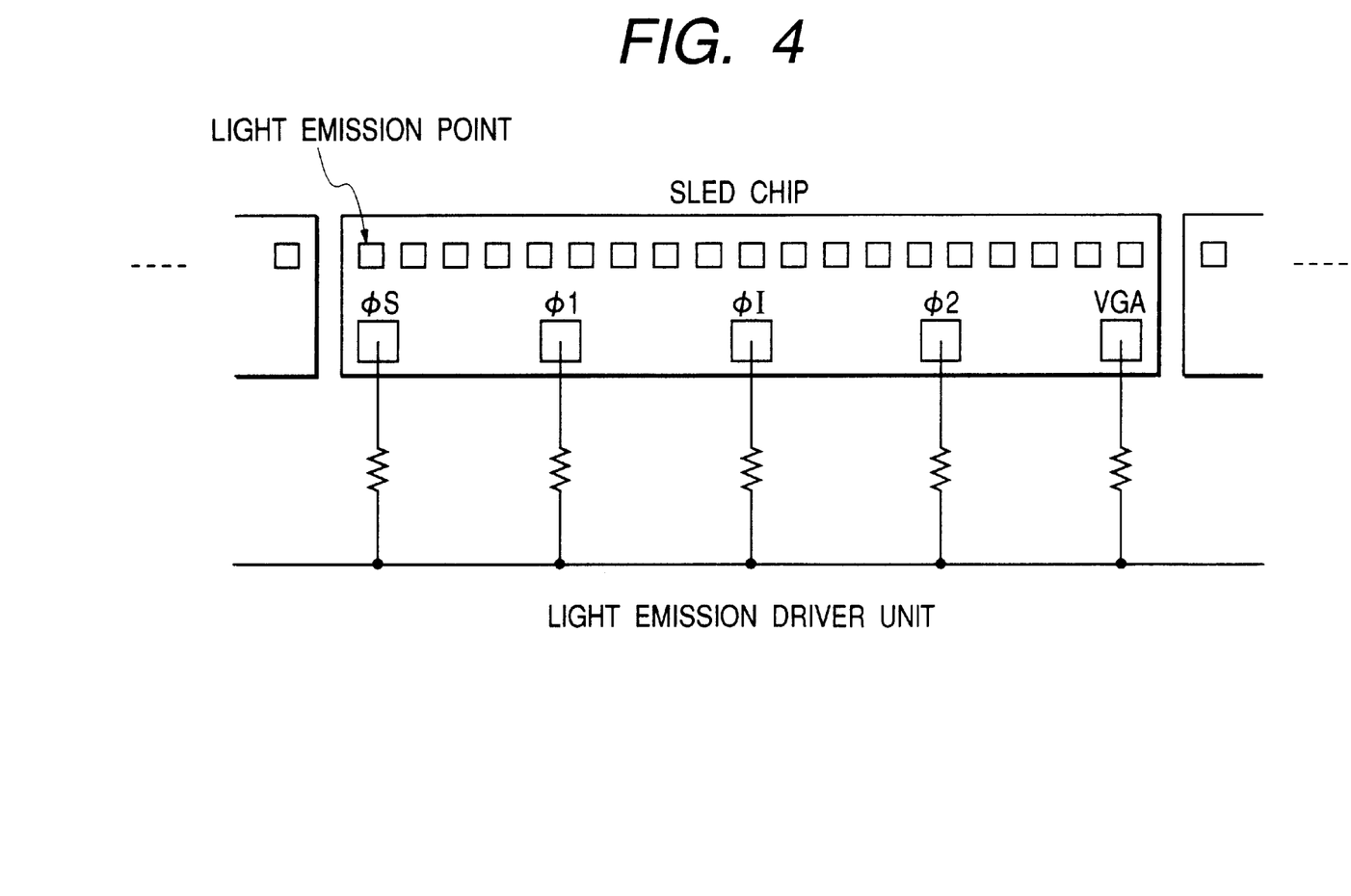
FIG. 4 is a connecting view showing a state of connecting SLED to a driver.

As shown in FIG. 4, in the SLED chip, a driver unit is connected to each of the start pulse $\phi$S and signals $\phi$1, $\phi$2 and $\phi$I in cascade through resistors.

Figure 3:
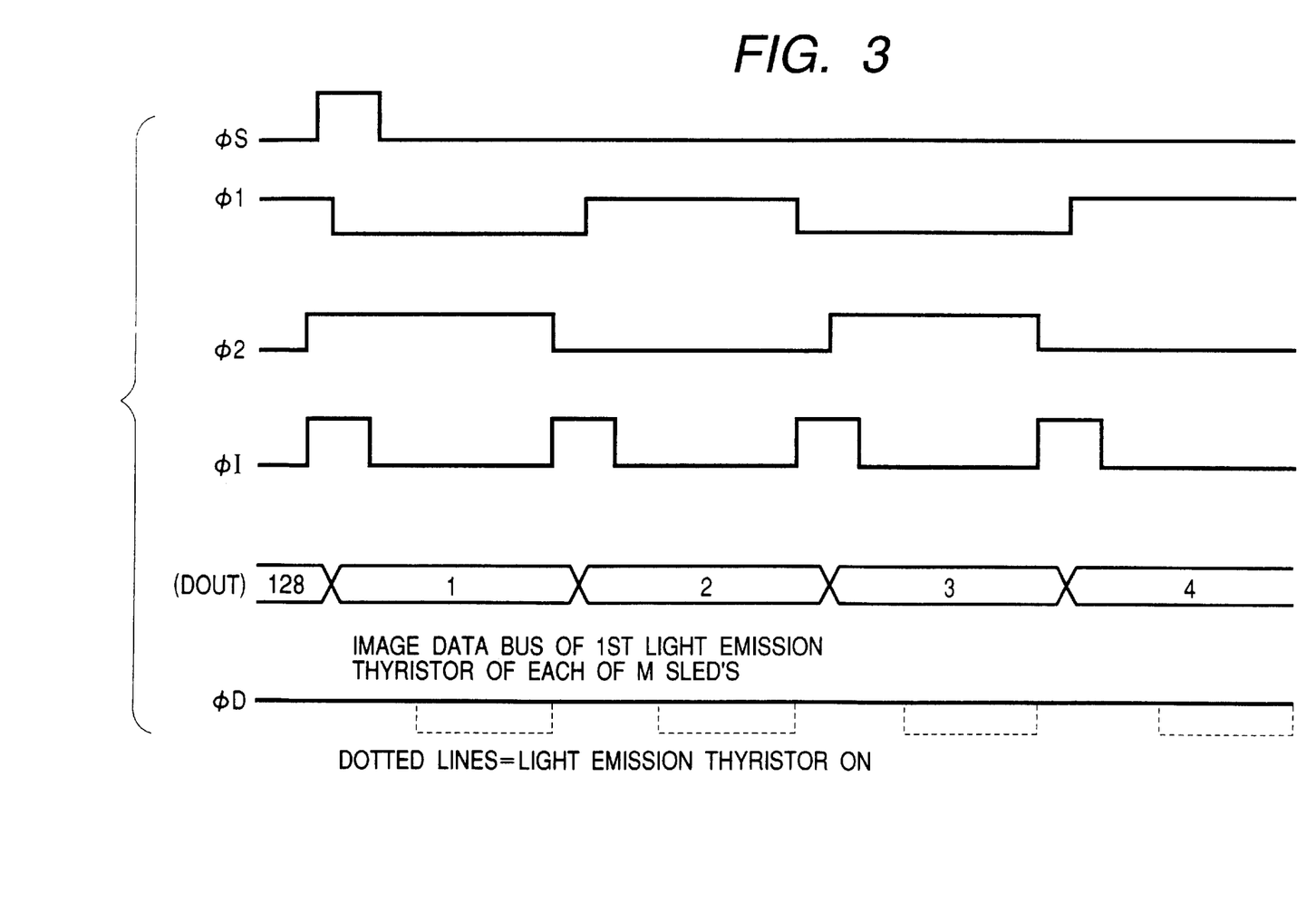
FIG. 3 is a control timing chart of the SLED.

FIG. 3 shows control signals for controlling the SLED and the control timing for lighting all elements. In accordance with a timing chart in FIG. 3, the transference and the emission will be described. The transference is started by varying the potential of the signal $\phi$S from 0V to 5V. When the voltage at the driver unit corresponding to the signal $\phi$S reaches 5V, each voltage of Va, Vb, Vc, Vd and Ve becomes the state that Va=5V, Vb=3.7V (voltage drop in the sequential order direction of diodes is defined as 1.3V), Vc=2.4V, Vd=1.1V and the voltage following after Ve becomes 0V, then the potential of the gate signals equivalent to 0V at the transfer thyristors 1' and 2' are respectively varied to 5V and 3.7V. It should be noted that Va, Vb, Vc, Vd and Ve respectively denote the voltage at portions of a, b, c, d and e in FIG. 2. In this state, by varying the voltage at the driver unit corresponding to the signal $\phi$1 from 5V to 0V, each potential at the transfer thyristor SR1' becomes the state that an anode is 5V, the cathode is 0V and the gate is 5V. This state satisfies the ON condition of the thyristor and even if the potential of the signal $\phi$S is varied to 0V in a state that the transfer thyristor 1' just becomes the ON state, the voltage Va $\cong$5V because the thyristor 1' is in the ON state. This is because a pulse is applied to the signal $\phi$S through the resistor.

When the thyristor is set in the ON state, the potential between the anode and the gate becomes nearly equal to zero. Therefore, even if the potential of the signal φS is varied to 0V, the ON condition of the first thyristor is maintained to complete a first shifting operation. In this state, when the potential of a driver signal φI for a use of driving the light emission thyristor is varied from 5V to 0V, since the state becomes the same condition as the transfer thyristor has been set in the ON state, the light emission thyristor 1 is set in the ON state and a first LED is to be lighted.

At the first LED, since the potential between the anode and the cathode of the light emission thyristor becomes zero by readjusting the potential of the driver signal φI to 5V and a minimum maintenance current for the thyristor cannot flow, the light emission thyristor 1 is to be set in the OFF state. Next, the transference of the thyristor ON condition from the thyristor SR1' to the thyristor SR2' will be described. Even if the thyristor SR1 is set in the OFF state, since the voltage at the driver unit corresponding to the signal φ1 has been maintained in 0V and the thyristor SR1' has been maintained in the ON state, the gate voltage Va at the thyristor SR1' is nearly equal to 5V and Vb is equal to 3.7V. In this state, by varying the voltage at the driver unit corresponding to the signal φ2 from 5V to 0V, each potential at the thyristor SR2' becomes the state that the anode is 5V, the cathode is 0V and the gate is 3.7V. Therefore, the thyristor SR2' is to be set in the ON state.

After the thyristor SR2' has been set in the ON state, by varying the voltage at the driver unit corresponding to the signal φ1 from 0V to 5V, the thyristor SR1' is set in the OFF state identically to a case that the thyristor SR1 has been set in the OFF state. In this manner, the ON state of the transfer thyristor is transferred from the SR1' to the SR2'. Then, when the voltage at the driver unit corresponding to the signal φ1 is varied from 5V to 0V, the thyristor SR2 is set in the ON state to be lighted. The reason for enabling only the light emission thyristor corresponding to the transfer thyristor which is in the ON state to be lighted is that in a case where the transfer thyristor is not in the ON state, since the gate voltage is 0V except for the thyristor adjacent to the thyristor in the ON state, the thyristor ON condition is not realized.

As concerns the adjacent thyristor, since the potential of the driver signal φI becomes 3.4V (corresponding to the voltage drop in the sequential order direction of the light emission thyristors) by setting the light emission thyristor in the ON state, the adjacent thyristor can not be set in the ON state because there is no potential difference between the gate and the cathode. The light emission control can be performed by sequentially repeating the above-mentioned procedure.

Figure 7:
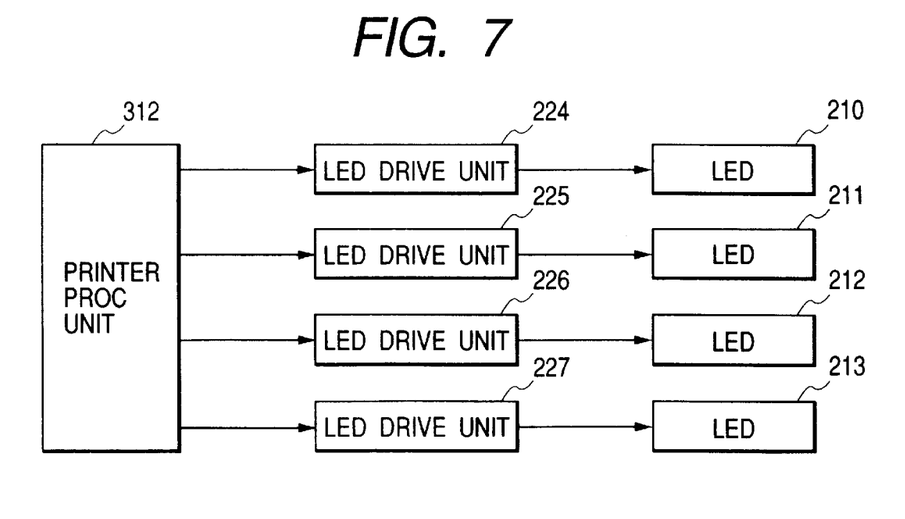
FIG. 7 is a block diagram for explaining the flow of image data.
Figure 8:
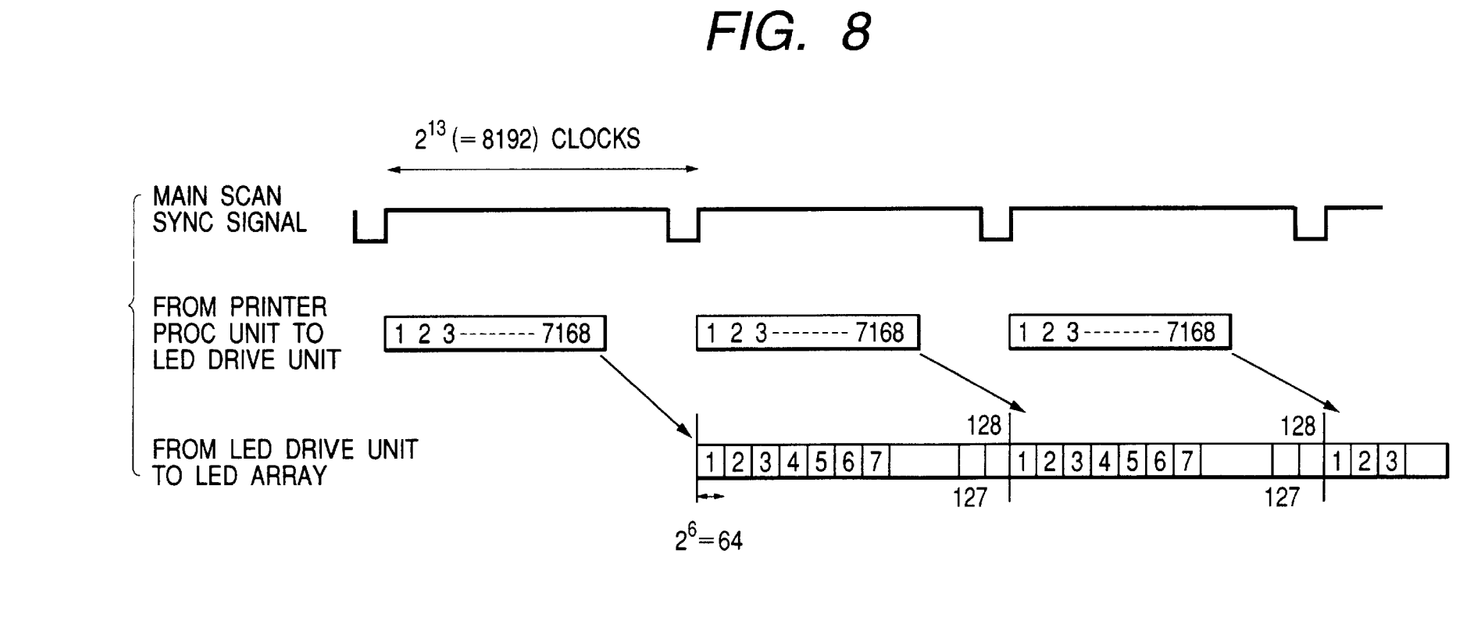
FIG. 8 is an explanation view showing a data transference timing from a printer process unit to the LED array.

The transference of an image will be described with reference to FIGS. 7 and 8 based on the light emission timing of the LED. Image data is transferred to the LED arrays 210, 211, 212 and 213 from the printer processing unit 312 one pixel by one pixel with one line unit in synchronism with the clock based on the timing of a main scan sync signal. The transferred image data for one line is accumulated in line memories in LED drive units 224, 225, 226 and 227 to sequentially start the light emission of the image data corresponding to the line based on the timing of a next main scan sync signal.

A periodic interval of the main scan sync signal corresponds to 8192 clocks of a transfer clock. This clocks corresponds to the number equal to 64-times of 128 pixels on one chip. The number 64 is larger than the number of chips 56 per one head and equal to the minimum value expressed by $2^n$. A control signal and image data are transmitted to the LED arrays 210, 211, 212 and 213 from the LED drive units 224, 225, 226 and 227 so as to sequentially light the LED'S with the interval of dividing 8192 clocks equally into 128 parts every chip. At this time, the necessary time for lighting one pixel corresponds to 64 ($=2^6$) reference clocks. An LED drive signal is generated by sequentially operating a 6-bit counter. An input period of image data for one line (period of the main scan sync signal) corresponds to 8192 ($=2^{13}$) reference clocks, therefore, the main scan sync signal is generated by sequentially operating a 13-bit counter. That is, the image data for one line is raster inputted in synchronism with the main scan sync signal. The reference clock can be used as the transfer clock for inputting the image data to the LED drive units 224, 225, 226 and 227 from the printer processing unit 312. That is, one pixel of image data is inputted per one reference clock. Since the value of $2^n$ is set to become the minimum value, an optimum clock period is realized without needlessly shortening the clock period.

Figure 9:
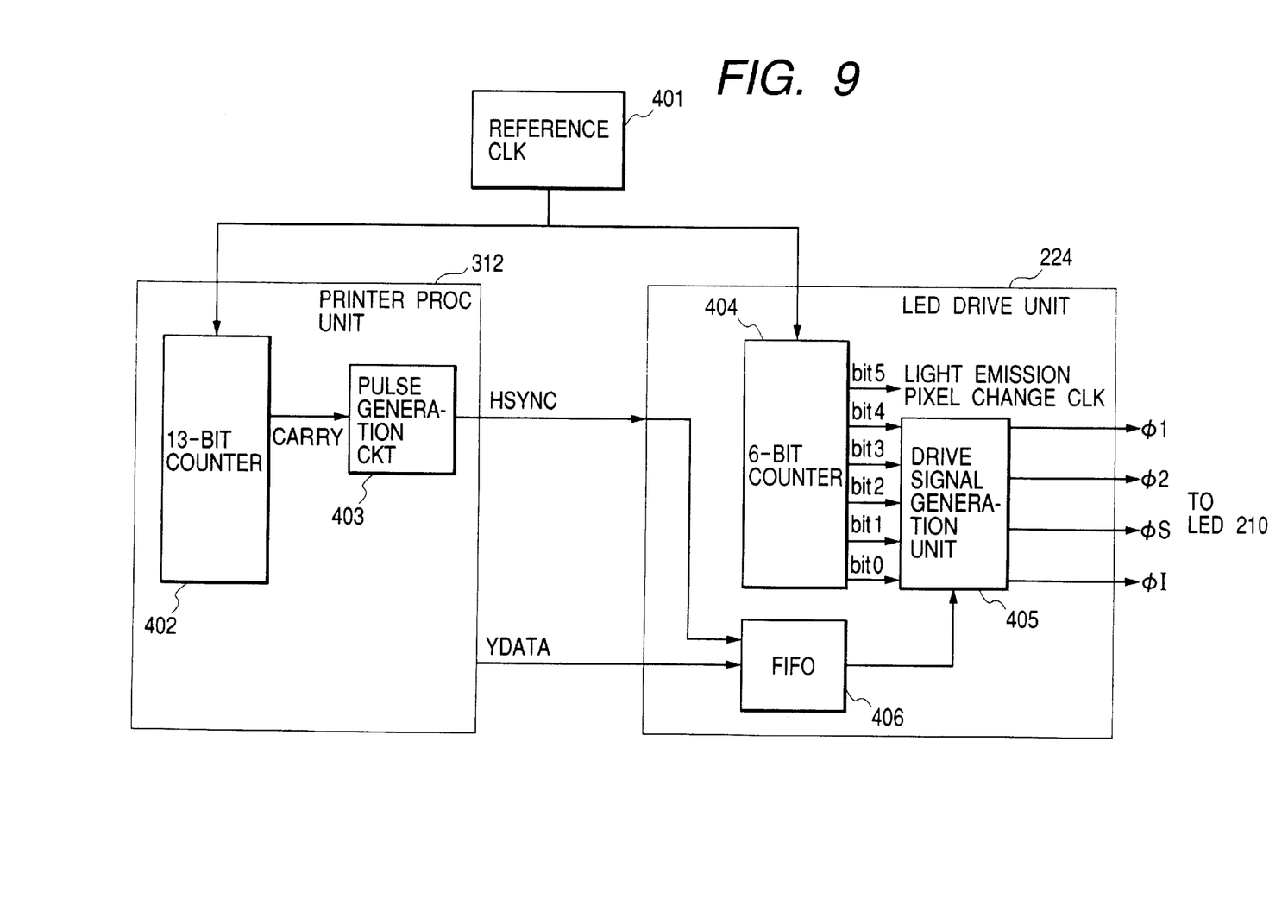
FIG. 9 is a view for preferably showing the feature of the embodiment.

Data transference from the printer processing unit 312 to the LED drive unit 224 and an LED drive circuit will be described in detail with reference to FIG. 9. Since the method of data transference from the printer processing unit 312 to the LED drive units 225, 226 and 227 is identical to the transference method from the printer processing unit 312 to the LED drive unit 224, the description there of will be omitted.

A reference clock 401 is given to the printer processing unit 312 and the LED drive unit 224 from an external unit. The reference clock 401 is used as not only an image data transfer clock for transferring the image data from the printer processing unit 312 to the LED drive unit 224 but also a main scan sync signal generation clock and an LED drive signal generation clock. A main scan sync signal (HSYNC) and image data (YDATA) are transmitted from the printer processing unit 312 to the LED drive unit 224. In the printer processing unit, a 13-bit counter 402 is provided and the HSYNC is outputted from a countable carry output portion through a pulse generation circuit 403. The LED drive unit 224 captures the YDATA corresponding to 7168 clocks from the HSYNC pulse transmitted from the printer processing unit 312 to supply the YDATA to a FIFO 406 using the reference clock. The LED drive unit 224 has a 6-bit counter 404, and outputs corresponding to bit 0 to bit 4 from the counter 404 are inputted to an LED drive signal generation unit 405 to generate the LED drive signals φ1, φ2, φS and φI. An output corresponding to bit 5 from the counter 404 is used as a light emission pixel change clock.

According to the above-mentioned embodiment, the structure of a circuit for generating a clock used to transfer image data and the structure of a circuit for generating timing signals used to drive a SLED chip can be simplified.

It should be noted that the present invention may be adapted to a system composed of plural devices (for example, host computer, interface device, reader, printer and the like) or may be adapted to a system composed of one device (for example, copying machine, facsimile apparatus or the like).

Moreover, it is evident that an object of the present invention can be achieved by supplying a storage medium, on which the program code of the software which realizes functions of the above-mentioned embodiment is recorded, to either the system or the apparatus and reading the program code stored in the storage medium using a computer (or CPU or MPU) of the system or the apparatus to execute the program code.

In this case, the program code itself, which is read from the storage medium, is to realize the functions of the above-mentioned embodiment and the storage medium which stores the program code is to constitute the present invention.

As the storage media for supplying the program code, for example, a floppy disk, a hard disk, an optical disk, a magnetooptical disk, a CD-ROM, a CD-R, a magnetic tape, a non-volatile memory card, a ROM and the like can be used.

Further, it is evident that not only the case of realizing the functions of the above-mentioned embodiment by executing the program code, which is read by the computer, but also the case of realizing the functions of the above-mentioned embodiment by performing a part of or all of an actual process by an OS (Operating System) or the like running on the computer on the basis of instructions of the program code are also included.

Further, it is evident that the case, where the program code read from the storage medium is written in a memory provided in a function extension board inserted in the computer or a function extension unit connected to the computer, and thereafter, a CPU or the like provided in the function extension board or the function extension unit performs a part of or all of the actual process on the basis of the instructions of the program code to realize the functions of the abovementioned embodiment, is also included.

As above, the present invention is described with reference to a preferable embodiment. However, the present invention is not limited to the above-mentioned embodiment, and various modifications and applications are possible within the spirit and scope of the appended claims.

What is claimed is:

1. An image formation apparatus which records an image on a recording medium, comprising:
   a recording element array head on which plural recording chips are arranged, plural recording elements being arrayed on each of the recording chips, and the total number of recording elements being larger than $2^{n1-1}$ (n1: positive number) and smaller than $2^{n1}$;
   reference clock generation means for generating a reference clock;
   main scan sync signal generation means for generating a main scan sync signal by dividing the reference clock into $2^{n1}$ parts;
   input means for raster inputting image data for one line in synchronism with the main scan sync signal;
   drive clock generation means for generating a drive clock by dividing the reference clock into $2^{n2}$ (n2: positive number) parts; and
   drive means for driving the recording chips in synchronism with the drive clock.

2. An apparatus according to claim 1, wherein said main scan sync signal generation means has an n1-bit counter, and said drive clock generation means has an n2-bit counter.

3. An apparatus according to claim 1, wherein said input means inputs the image data for one pixel on the basis of the reference clock.

4. An apparatus according to claim 1, wherein the recording elements are scanned in each of the recording chips.

5. An apparatus according to claim 4, wherein transfer elements used for scanning the recording elements in the recording chips are respectively provided in each of the recording chips.

6. An apparatus according to claim 1, wherein the recording elements are light emission elements.

7. An apparatus according to claim 1, wherein the recording elements are light emission thyristors.

* * * * *

UNITED STATES PATENT AND TRADEMARK OFFICE
CERTIFICATE OF CORRECTION

PATENT NO. : 6,262,758 B1
DATED : July 17, 2001
INVENTOR(S) : Kazuyoshi Suzuki et al.

It is certified that error appears in the above-identified patent and that said Letters Patent is hereby corrected as shown below:

Column 6,
Line 29, "there of" should read -- thereof --.

Column 7,
Line 30, "abovementioned" should read -- above-mentioned --.

Signed and Sealed this

Nineteenth Day of March, 2002

Attest:

JAMES E. ROGAN
*Director of the United States Patent and Trademark Office*

*Attesting Officer*